US012184996B2

(12) United States Patent
Lenhard et al.

(10) Patent No.: US 12,184,996 B2
(45) Date of Patent: Dec. 31, 2024

(54) LIGHT SENSOR

(71) Applicant: ams International AG, Jona (CH)

(72) Inventors: Herbert Lenhard, Graz (AT); Karl Waser, Unterpremstätten (AT); Bernhard Greimel-Laengauer, Hofstätten an der Raab (AT); Mario Teufel, Gratwein (AT)

(73) Assignee: ams International AG, Jona (CH)

( * ) Notice: Subject to any disclaimer, the term of this patent is extended or adjusted under 35 U.S.C. 154(b) by 85 days.

(21) Appl. No.: 17/775,267

(22) PCT Filed: Nov. 5, 2020

(86) PCT No.: PCT/EP2020/081094
§ 371 (c)(1),
(2) Date: May 6, 2022

(87) PCT Pub. No.: WO2021/089682
PCT Pub. Date: May 14, 2021

(65) Prior Publication Data
US 2022/0417454 A1    Dec. 29, 2022

Related U.S. Application Data

(60) Provisional application No. 62/932,713, filed on Nov. 8, 2019.

(51) Int. Cl.
*H04N 25/50* (2023.01)
*H04N 25/75* (2023.01)

(52) U.S. Cl.
CPC ............ *H04N 25/50* (2023.01); *H04N 25/75* (2023.01)

(58) Field of Classification Search
CPC ...... H04N 25/50; H04N 25/75; H04N 25/534; H04N 25/533; G01J 1/44; G01J 2001/446
See application file for complete search history.

(56) References Cited

U.S. PATENT DOCUMENTS 7,038,820 B1    5/2006  Kindt
2006/0012697 A1  1/2006  Boemler
(Continued)

FOREIGN PATENT DOCUMENTS

EP    1227662 A2    7/2002

OTHER PUBLICATIONS

International Search Report and Written Opinion issued in connection with PCT Patent Application No. PCT/EP2020/081094 dated Nov. 30, 2020.

(Continued)

*Primary Examiner* — Kelly L Jerabek
(74) *Attorney, Agent, or Firm* — Viering, Jentschura & Partner mbB

(57) ABSTRACT

A light sensor is disclosed. The light sensor comprises a first pixel and a second pixel. The light sensor comprises measurement circuitry. The first pixel is configured to accumulate a first charge and the second pixel is configured to accumulate a second charge when the light sensor is exposed to light. The first pixel is configured to trigger the measurement circuitry to measure the second charge when the first charge reaches a threshold capacity of the first pixel. Also disclosed is an active pixel sensor comprising the light sensor, an image sensor and a device incorporating the light sensor.

20 Claims, 6 Drawing Sheets

(56) References Cited

U.S. PATENT DOCUMENTS

| | | |
|---|---|---|
| 2007/0262237 A1 | 11/2007 | Mann |
| 2011/0013064 A1 | 1/2011 | Lahav et al. |
| 2014/0267884 A1 | 9/2014 | Shen et al. |
| 2017/0324917 A1 | 11/2017 | Mlinar et al. |
| 2019/0273114 A1 | 9/2019 | Liu |
| 2019/0333953 A1* | 10/2019 | Zhao ................ H01L 27/14629 |
| 2020/0013820 A1* | 1/2020 | Rideau ................ H01L 27/1462 |

OTHER PUBLICATIONS

Office Action of corresponding European Patent Application No. 20803493.4, dated Dec. 7, 2023, 8 pages (for informational purposes only).

Chinese office action issued for the corresponding Chinese patent application No. 202080089741.5, dated Aug. 2, 2024, 8 pages (only for informational purposes).

\* cited by examiner

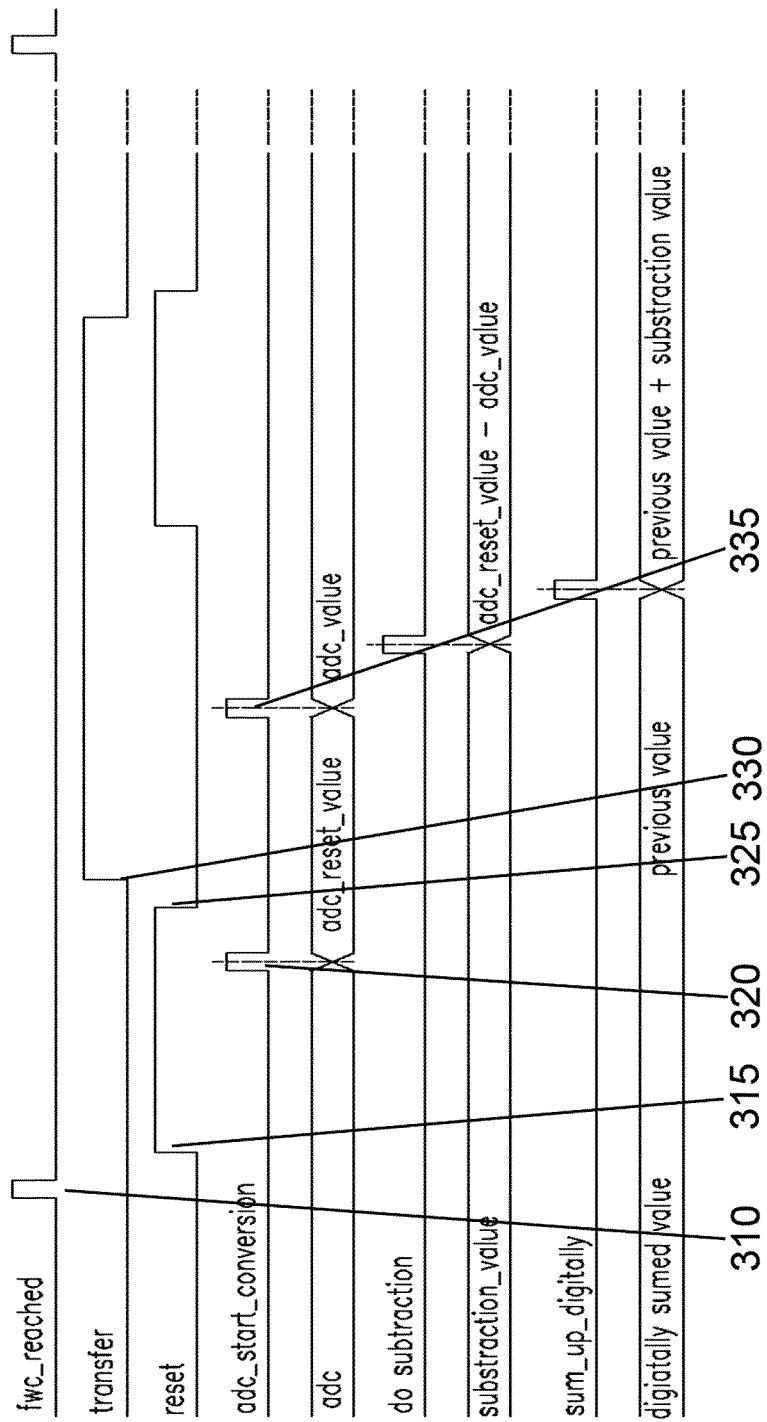

LIGHT SENSOR

RELATED APPLICATIONS

The present invention is a U.S. National Stage under 35 USC 371 patent application, claiming priority to Serial No. PCT/EP2020/081094, filed on Nov. 5, 2020, which claims priority from U.S. Provisional Patent Application No. 62/932,713 filed on Nov. 8, 2019; the entireties of both are hereby incorporated herein by reference.

FIELD OF INVENTION

The present disclosure relates to a light sensor, an active pixel sensor and an image sensor. The light sensor may be for an imaging device, such as may be found on a mobile device like a mobile phone.

BACKGROUND TO INVENTION

Image sensors are widely used in a range of devices such as cellular phones, digital cameras and other image recording devices. Such image sensors may be, for example, charged-coupled device (CCD) sensors or Complementary Metal-Oxide-Semiconductor (CMOS) image sensors.

A typical CMOS image sensor comprises an array of pixels, wherein each pixel within the array comprises a photodetector, such as a photodiode, and one or more transistors to control and/or activate the pixel.

Such photodiodes are configured to generate and store an electrical charge when exposed to incident light. A maximum storage capacity of a photodiode, or more generally of a pixel, is known as a "Full-Well Capacity" (FWC). The FWC may be defined as the amount of charge an individual pixel can store before saturating.

FWC is fundamental to the performance of a pixel: a reduced FWC means a lower dynamic range and a lower signal-to-noise ratio. The FWC of pixels in an image sensor, e.g. an array of pixels, may relate to the ability of the image sensor to capture an image having dark and bright objects at the same time. Charge storage on pixels reaching FWC, e.g. effectively saturating the pixel, may result in optical aberrations such as blooming. As such, it is generally desirable to maximize the FWC of a pixel to maximize a dynamic range and signal-to-noise ratio of the pixel.

A larger FWC can be achieved, for example, by increasing an area of a photodiode within a pixel, e.g. increasing geometries of charge storage structures within the pixel. However, such an approach conflicts with current commercial demands for higher resolution yet lower power image sensors, which has generally driven increased miniaturization and integration of image sensors. In general, smaller pixels can suffer from more limited FWC than larger pixels due, at least in part, to a limited charge storage area of the smaller pixels.

Furthermore, in current CMOS image sensors, photodiodes are typically used to generate and store a charge during an integration time, i.e. a time interval when light is incident upon the photodiode, also known as an exposure time. An integration time of an image sensor, or pixels within a sensor, is commonly selected to avoid a charge stored on pixels within the sensors reaching FWC. However, selection of an optimum integration time may be problematic and difficult, because a FWC of a pixel may be difficult to predict accurately, due at least in part to a dependency of the FWC upon temperature and incident light levels.

It is an object of at least one embodiment of at least one aspect of the present disclosure to obviate or at least mitigate at least one of the above identified shortcomings of the prior art.

SUMMARY OF INVENTION

According to a first aspect, there is provided a light sensor comprising a first pixel, a second pixel and measurement circuitry. The first pixel is configured to accumulate a first charge and the second pixel is configured to accumulate a second charge when the light sensor is exposed to light. The first pixel is configured to trigger the measurement circuitry to measure the second charge when the first charge reaches a threshold capacity of the first pixel.

Advantageously, the first pixel ensures that a measurement of the charge in the second pixel is made before the charge in the second pixel reaches a threshold (e.g. FWC), thus preventing the second pixel from saturating. Beneficially, avoiding saturation of the second pixel ensures no light information is lost during an exposure time. Beneficially, this makes the light sensor particularly suited to applications in which a long integration time is required.

The first pixel may comprise a pinned photodiode. The second pixel may comprise a pinned photodiode.

The threshold capacity may correspond to a full-well capacity of the first pixel.

The threshold capacity may correspond to a proportion of the full-well capacity of the first pixel. For example, the threshold capacity may correspond to 90%, 80%, 70% or even less of the full-well capacity of the first pixel.

The first and second pixels may be configured such that, when the light sensor is exposed to light, the first charge reaches the threshold capacity of the first pixel before the second charge reaches a full-well capacity of the second pixel.

The second pixel may be configured to be less sensitive to a range of wavelengths of light than the first pixel.

The second pixel may be configured to be less exposed to a range of wavelengths of light than the first pixel.

The second pixel may comprise a layer configured to restrict incidence of a range of wavelengths of light upon at least a portion of a light-sensitive section of the second pixel.

The layer may comprise a material that is substantially opaque or translucent to a range of wavelengths of light that the light-sensitive section of the second pixel is sensitive to.

A reset voltage of the first pixel may be different to a reset voltage of the second pixel. Preferably, a reset voltage of the first pixel may be lower than a reset voltage of the second pixel.

The first pixel and the second pixel may be fabricated to exhibit substantially the same electrical characteristics. The first pixel and the second pixel may be fabricated to comprise substantially the same full-well capacity.

The light sensor may be fabricated as a monolithic device. The first pixel and the second pixel may be fabricated as a monolithic device. The light sensor may be a CMOS device.

The light sensor may comprise discrete components. At least one of the first pixel, the second pixel, the measurement circuit, or components thereof, may be fabricated independently.

The measurement circuitry may comprise an analogue to digital converter (ADC). The ADC may be configured to convert a voltage corresponding to the second charge into a digital signal.

The light sensor may comprise a state machine and/or programmable logic and/or a central processing unit (CPU) and/or a circuit. The state machine and/or programmable logic and/or CPU and/or circuit may be configured to repeat the following steps for a predefined exposure time: 1. Reset the first and second pixels; and 2. Trigger the measurement circuitry to measure the second charge when the first charge reaches the threshold capacity.

The state machine and/or programmable logic and/or CPU and/or the circuit may be configured to determine a total charge over the predefined exposure time by accumulating successive measurements of the second charge.

The state machine and/or programmable logic and/or CPU and/or the circuit may be configured to compensate for an overhead time incurred during measurement of the second charge.

The first pixel and/or the second pixel may comprise a 4T active pixel.

The light sensor may comprise a plurality of second pixels.

Each second pixel may be configured to accumulate an associated charge when the light sensor is exposed to light. The first pixel may be configured to trigger the measurement circuitry to measure the associated charges when the first charge reaches the threshold capacity.

According to a second aspect, there is provided an active pixel sensor comprising a plurality of light sensors according to the first aspect.

A first light sensor of the plurality of light sensors may be sensitive to light within a first range of wavelengths.

A second light sensor of the plurality of light sensors may be sensitive to light within a second range of wavelengths different to the first range of wavelengths.

The active pixel sensor may be configured to operate as a colour (e.g. red, green, blue (RGB)) image sensor.

The active pixel sensor may be configured to operate as a wideband image sensor. For example, the active pixel sensor may be configured to sense visible light across the entire visible spectrum, e.g. light with wavelengths in a range of approximately 380 nm to 740 nm.

The active pixel sensor may be configured to operate as a flicker image sensor, e.g. a sensor configured to determine a frequency of incident light.

According to a third aspect, there is provided an image sensor comprising an array of pixels, and at least one light sensor according to the first aspect.

According to a fourth aspect, there is provided a device comprising a processor and at least one image sensor according to the third aspect and/or at least active pixel sensor according to the second aspect and/or at least one light sensor according to the first aspect.

The device may be, for example, a cellular telephone, a digital camera, a security camera, a laptop or tablet device, an image recording device, or the like.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilised, either alone or in combination with any other defined feature, in any other aspect or embodiment or to form a further aspect or embodiment of the disclosure.

BRIEF DESCRIPTION OF DRAWINGS

These and other aspects of the present disclosure will now be described, by way of example only, with reference to the accompanying drawings, which are:

FIG. 3 a timing diagram corresponding to operation of the light sensor of FIG. 2A;

FIG. 1 depicts a representation of a prior art four transistor (4T) active pixel, generally denoted 100. The active pixel 100 comprises a photodiode 105, a reset transistor 110, a transfer transistor 115, a source follower transistor 125, and a row select transistor 130.

Figure 1:
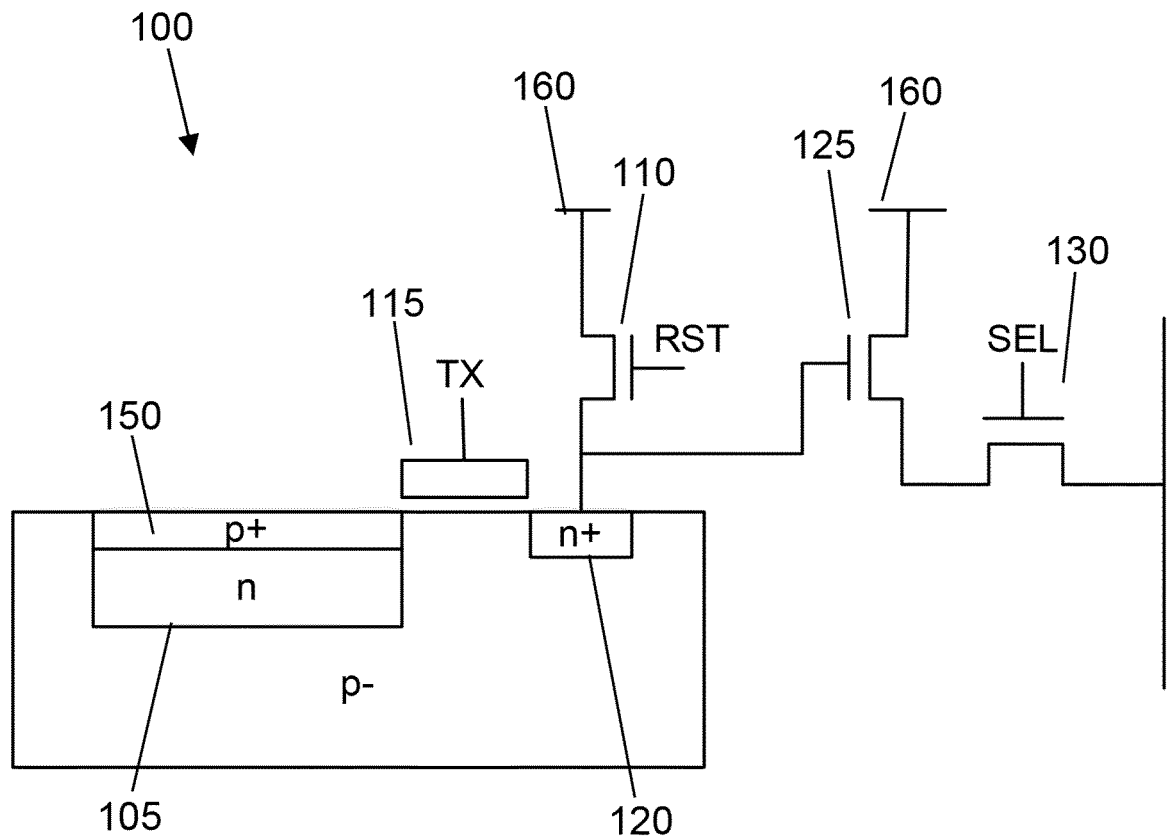
FIG. 1 a representation of a prior art four transistor (4T) Pinned Photodiode (PPD) pixel.

For purposes of example, a CMOS structure of the photodiode 105 and the transfer transistor 115 are shown with well structures within a substrate. For simplicity, the reset transistor 110, the source follower transistor 125 and the row select transistor 130 are shown as symbolic representations of transistors.

The photodiode 105 comprises a p-n junction diode configured to be exposed to light and to convert incident light into a voltage signal though a process of optical absorption. The principles of generation of electron-hole pairs by optical absorption is well known, and will not be described here for reasons of expediency.

The photodiode 105 in active pixel 100 is a pinned photodiode (PPD). That is, the photodiode 105 has been passivated with a shallow p+ implant 150, known as a pinning layer, above a light sensitive structure of the photodiode 105. The pinning layer 150 permits a total transfer of charge onto an $n^+$ floating diffusion node 120 under the control of the transfer transistor 115, as will be described below. Again, PPDs are well known in the art and will not be further described at this juncture.

The transfer transistor 115 comprises the floating diffusion node 120. The transfer transistor 115 is configured to move a charge from the photodiode 105 to the floating diffusion node 120.

The reset transistor 110 is coupled between the voltage reference 160 and the floating diffusion node 120 to reset the active pixel 100, e.g., discharge or charge the floating diffusion node 120 and the photodiode 105 to a reset voltage under control of the reset transistor 110.

The source follower transistor 125 is operated effectively as a voltage buffer. An input voltage, e.g. a voltage at a gate of the source follower transistor 125, corresponds to a voltage of the floating diffusion node 120. An output of the source follower transistor 125, e.g. the source terminal of the source follower transistor 125, generally corresponds to the voltage at the gate of the source follower transistor 125, minus a voltage dropped across the source follower transistor 125. Beneficially, the source follower transistor 125 does not draw a substantial current from the floating diffusion node 120, thus allowing a measurement of a voltage at the floating diffusion node 120 without discharging the floating diffusion node 120.

The row select transistor 130 selectively couples the voltage at the source of the source follower transistor 125 to a further circuit, typically comprising measurement circuitry such as an ADC, to measure the effective voltage at the floating diffusion node 120. In use, the voltage at the floating diffusion node 120 corresponds to a charge stored at the floating diffusion node 120, and thus is indicative of an intensity of light which the photodiode has been exposed to over an exposure time.

A typical mode of operation of the prior art 4T active pixel 100 is as follows. In an initial stage of operation, a reset signal RST is asserted at a gate of the reset transistor 110 and a transfer signal TX is asserted at a gate of the transfer transistor 115. By simultaneously turning on the reset transistor 110 and the transfer transistor 115, the floating diffusion node 120 and the photodiode 105 are connected to the voltage reference 160, e.g. a power supply rail. This condition represents a reset state of the active pixel 100. That is, the voltage reference 160 provides a reset voltage for the active pixel 100.

Next, the transfer signal TX is negated at the gate of the transfer transistor 115, effectively turning off the transfer transistor 115 and the reset signal RST is negated at the gate of the reset transistor 110 to turn off the reset transistor 110, thus electrically isolating the photodiode 105 from the voltage reference 160.

At this stage, the photodiode 105 may be exposed to light, and will commence accumulation of charge accordingly. That is, an exposure time is commenced by negating the transfer signal TX and permitting incident light to charge the photodiode 105. As photo-generated electrons accumulate in the photodiode 105, a voltage at the photodiode 105 decreases.

After a period of time, known as an integration time or exposure time, the level of accumulated charge and hence the amount of light incident upon the photodiode 105 may be determined as follows.

The reset signal RST may be asserted at the gate of the reset transistor 110 to reset the floating diffusion node 120 to the voltage reference 160. In any event, at the end of the exposure time, the reset signal RST is de-asserted to isolate the floating diffusion node 120.

Next, the transfer signal TX is temporarily asserted at a gate of the transfer transistor 115 to allow the accumulated charge on the photodiode 105 to be transferred to the floating diffusion node 120. That is, the photodiode 105 is temporarily coupled to the floating diffusion node 120, and hence to a gate of the source follower transistor 125. The charge transfer causes the voltage of the floating diffusion node 120 to drop from the voltage reference 160 to a second voltage indicative of the amount of charge accumulated on the photodiode 105 during the exposure time.

Upon completion of the charge transfer, the row select transistor 130 is configured to couple the voltage at the source of the source follower transistor 125 to a further circuit, typically comprising a ramp-ADC (not shown), to measure the effective voltage at the floating diffusion node 120.

In some instances, the reset voltage, e.g. voltage reference 160, of the floating diffusion node 120 may also be measured before and/or after the measurement of the charge transfer from the photodiode 105. As such, a more accurate measurement of the charge transfer can be made by subtracting the measured reset voltage from the measured voltage due to the charge transfer from the photodiode 105.

Figure 2A:
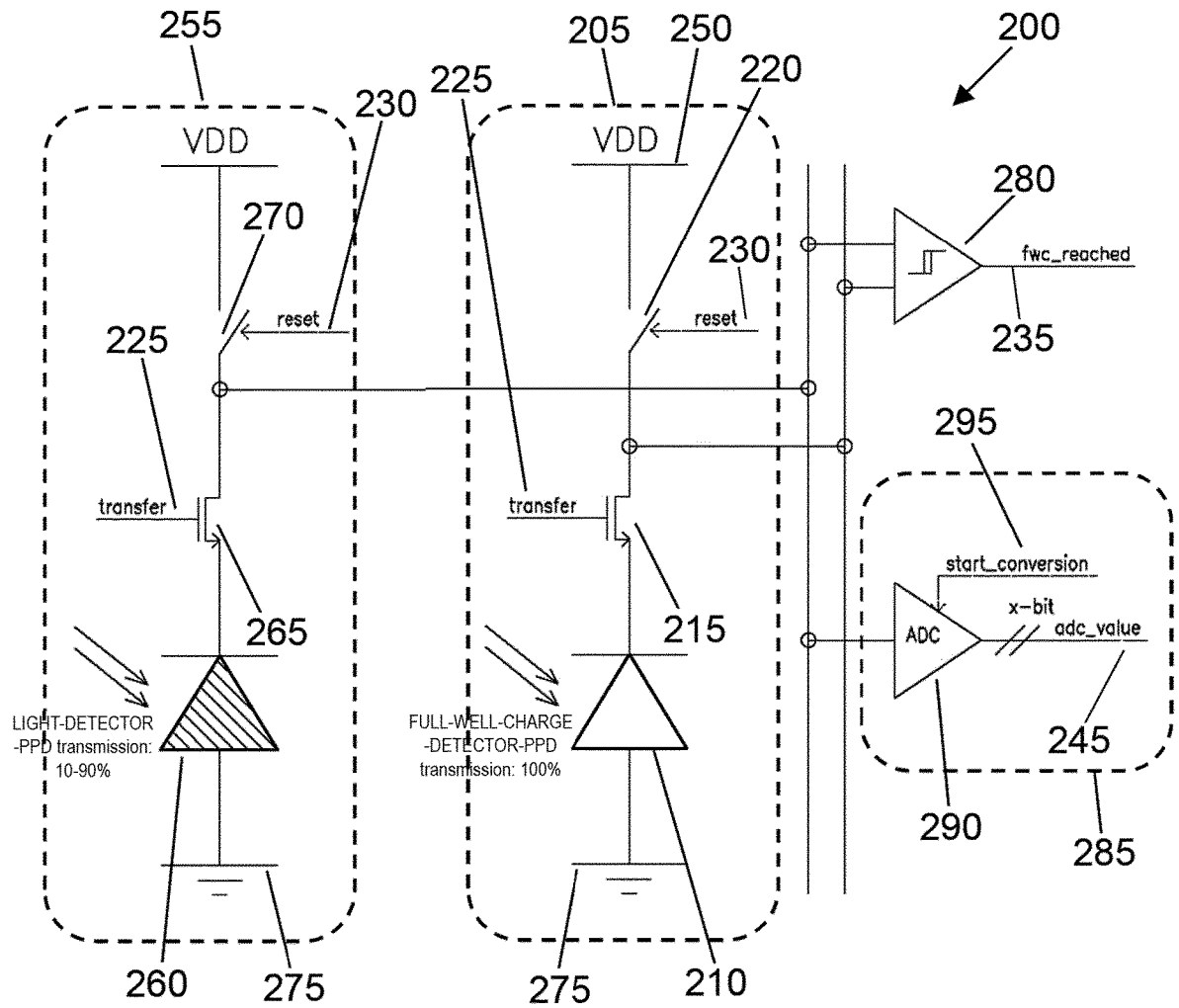
FIG. 2A a schematic diagram of a light sensor according to an embodiment of the present disclosure.

FIG. 2A shows a schematic diagram of a light sensor, generally denoted 200, according to an embodiment of the present disclosure.

The light sensor 200 comprises a first pixel 205. The first pixel 205 is configured to operate as a FWC detector, as will be described below in more detail.

The first pixel 205 comprises a first PPD 210. The first pixel 205 comprises a first transfer transistor 215 and a first reset transistor 220. For purposes of illustration only, the first reset transistor 220 is depicted using a generic switch symbol, which represents the functionality that the first reset transistor 220 provides. One of skill in the art will appreciate that the first reset transistor 220 may be, for example, an NMOS transistor, or the like.

An anode of the first PPD 210 is coupled to a first voltage reference 275. In the example embodiment of FIG. 2A, the first voltage reference 275 is ground, e.g. 0V.

A cathode of the first PPD 210 is coupled to a source of the first transfer transistor 215.

A gate of the first transfer transistor 215 is coupled to a transfer signal 225. A drain of the first transfer transistor 215 is coupled to the first reset transistor 220. In one embodiment, a drain of the first transfer transistor 215 is coupled to a source of the first reset transistor 220.

As such, the first transfer transistor 215 is configurable by the transfer signal 225 to couple the cathode of the first PPD 210 to the first reset transistor 220, and to further circuitry as will be described below.

The first reset transistor 220 is coupled to a second voltage reference 250. The second voltage reference 250 may be a power supply rail, such as a 5V, 3V, 1.8V rail, or the like. In one example embodiment, the first reset transistor 220 is an NMOS transistor, and a drain of the first reset transistor 220 is coupled to the second voltage reference 250 and a source of the first reset transistor 220 is coupled to the drain of the first transfer transistor 215.

A gate of the first reset transistor 220 is coupled to a reset signal 230. As such, the first reset transistor 220 is configurable by the reset signal 230 to couple the first transfer transistor 215 to the second voltage reference 250.

One will appreciate that the arrangement of the first PPD 210, the first transfer transistor 215 and the first reset transistor 220 that form the first pixel 205 generally corresponds to the arrangement of the PPD 105, the transfer transistor 115 and the reset transistor 110 respectively of the active pixel 100 of FIG. 1. That is, the first reset transistor 220 and the first transfer transistor 215 are configurable by the reset signal 230 and the transfer signal 225 respectively to reset the first pixel 205 to a reset voltage, e.g. second voltage reference 250, and to isolate a first floating diffusion node (not shown) associated with the first transfer transistor 215.

Not shown in FIG. 2A, for purposes of simplicity, is the first floating diffusion node, which may be considered a charge-storing element, e.g. a capacitive element, coupled between the drain of the first transfer transistor 215 and the first voltage reference 275, e.g. 0V.

The light sensor 200 also comprises a second pixel 255. The second pixel 255 is configured to operate as a light detector, as will be described below in more detail. The second pixel 255 comprises a second PPD 260. The second pixel 255 comprises a second transfer transistor 265 and a second reset transistor 270. For purposes of illustration only, the second reset transistor 270 is depicted using a generic switch symbol, which represents the functionality that the second reset transistor 270 provides. One of skill in the art will appreciate that the second reset transistor 270 may be an NMOS transistor, or the like.

An anode of the second PPD 260 is coupled to the first voltage reference 275. A cathode of the second PPD 260 is coupled to a source of the second transfer transistor 265.

A gate of the second transfer transistor 265 is coupled to the transfer signal 225. A drain of the second transfer transistor 265 is coupled to the second reset transistor 270. In one embodiment, a drain of the second transfer transistor 265 is coupled to a source of the second reset transistor 270.

As such, the second transfer transistor 265 is configurable by the transfer signal 225 to couple the cathode of the second PPD 260 to the second reset transistor 270, and to further circuitry as will be described below.

The second reset transistor 270 is coupled to the second voltage reference 250. In one example embodiment, second reset transistor 220 is an NMOS transistor, and a drain of the second reset transistor 220 is coupled to the second voltage reference 250 and a source of the second reset transistor 270 is coupled to the drain of the second transfer transistor 265.

A gate of the second reset transistor 270 is coupled to the reset signal 230. As such, the second reset transistor 270 is configurable by the reset signal 230 to couple the second transfer transistor 265 to the second voltage reference 250.

One will appreciate that the arrangement of the second PPD 260, the second transfer transistor 265 and the second reset transistor 270 that form the second pixel 265 generally corresponds to the arrangement of the PPD 105, the transfer transistor 115 and the reset transistor 110 respectively of the active pixel 100 of FIG. 1. That is, the second reset transistor 270 and the second transfer transistor 265 are configurable by the reset signal 230 and the transfer signal 225 respectively to reset the second pixel 255 to the reset voltage, e.g. second voltage reference 250, and to isolate a second floating diffusion node (not shown) associated with the second transfer transistor 265.

Not shown in FIG. 2A, for purposes of simplicity, is the second floating diffusion node, which may be considered a charge-storing element, e.g. a capacitive element, coupled between the drain of the second transfer transistor 265 and the first voltage reference 275, e.g. 0V.

The first pixel 205, and in particular the first PPD 210, is configured to be exposed to light, such as ambient light and/or light from a light source and/or light of a particular range of wavelengths that the first PPD 210 is sensitive to. In one example embodiment, the light sensor 200 may be configured for front side illumination, e.g. illumination of a side of a semiconductor substrate (not shown), on which the first PPD 210 is fabricated. Alternatively, or additionally, the light sensor 200 may be configured for back side illumination, e.g. illumination of a side of a semiconductor substrate (not shown) opposite to the side on which the first PPD 210 is fabricated.

The second pixel 255, and in particular the second PPD 260, is also configured to be exposed to light, e.g. from the same source(s) of light that the first pixel 205 is exposed to. The second PPD 260 is configured to have a different sensitivity to the light compared to the first PPD 210. In one example embodiment, the light sensor 200 may be configured such that an amount, or intensity, of light incident upon the second PPD 260 is less than an amount, or intensity, of light incident upon the first PPD 210. This may be achieved in one of several ways. For example, an area of the second PPD 260 exposed to the source(s) of light relative to an area of the first PPD 210 exposed to the source(s) of light may be lesser. For example, a mask may be implemented on one or more layers of the light sensor 200 to reduce an area of the second PPD 260 exposed to the source(s) of light relative to an area of the first PPD 210 exposed to the source(s) of light. Such a mask may comprise, or be formed in, a metal layer. Such a mask may comprise a material that is substantially opaque or translucent to a range of wavelengths of light that the light-sensitive section of the second pixel is sensitive to.

In another embodiment, a layer, such as a mask layer, may completely cover the second pixel 255, or at least the second PPD 260. Such a layer may be only partially opaque to a range of wavelengths of light that the light-sensitive section of the second pixel is sensitive to, e.g. such a layer may be translucent.

In one example embodiment, the second PPD 260 is configured to be exposed to between 10% and 90% of the light that the first PPD 210 is configured to be exposed to, when the light sensor 200 is exposed to light. In another embodiment, the second PPD 260 is configured to be exposed to between 20% and 80% of the light that the first PPD 210 is configured to be exposed to, when the light sensor 200 is exposed to light. It will be appreciated that other ranges may be applicable, wherein the second PPD 260 is configured to be exposed to less light, e.g. a lower intensity of light, that the first PPD 210.

In the example embodiment of FIG. 2A, the drain of the first transfer transistor 215 is coupled to a first input to a comparator 280 and the drain of the second transfer transistor 265 is coupled to a second input to the comparator 280. As such, the comparator 280 is configured to compare a voltage at the drain of the first transfer transistor 215, which corresponds to a charge stored in the first floating diffusion node, to a voltage at the drain of the second transfer transistor 265, which corresponds to a charge stored in the second floating diffusion node.

In the example embodiment of FIG. 2A, the comparator is a Schmitt trigger, thus providing a degree of hysteresis to compensate for any small fluctuations due to noise on either of the inputs to the comparator 280. In other embodiments the comparator may be, for example, a generic operational amplifier.

The drain of the second transfer transistor 265 is also coupled to measurement circuitry 285.

In the example embodiment shown, the measurement circuitry 285 comprises an integrating Analog-to-Digital Converter (ADC) 290, known as a "ramp ADC". The integrating ADC 290 is configured to be triggered by a start_conversion signal 295. That is, asserting the start_conversion signal 295 triggers the ADC 290 to provide a digital signal, denoted adc_value 245 in FIG. 2A, corresponding to the voltage at the drain of the second transfer transistor 265, which corresponds to the charge stored in the second floating diffusion node.

It will be appreciated that, in other embodiments, different types of ADC may be used, such as a flash ADC, a sigma-delta ADC or a successive approximation ADC. The selection of ADC type may depend upon, for example, power and/or area constrains of the light sensor, timing constraints of the ADC, and/or requirements relating to scaling or integration of the light sensor 200 into a device, or the like.

Figure 2B:
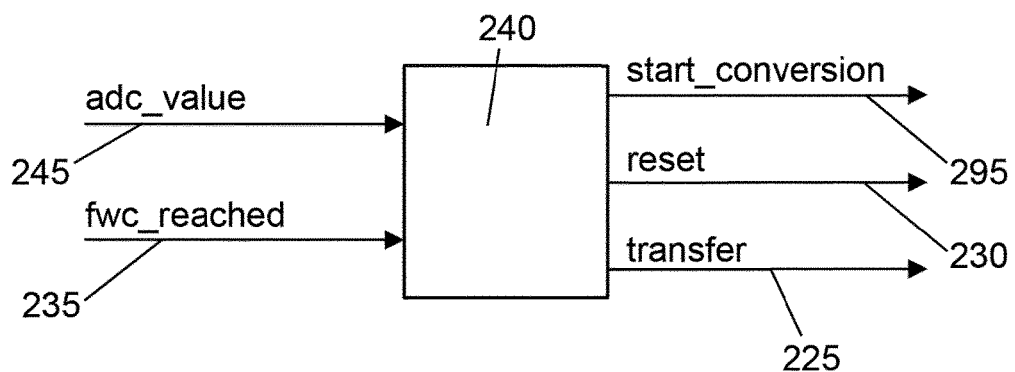
FIG. 2B a schematic diagram of a state machine for use with the light sensor of FIG. 2A.

In an example embodiment, an output 235 from the comparator 280 and digital signal adc_value 245 are inputs to a state machine 240, as shown in FIG. 2B. The reset signal 230, the transfer signal 225 and the start_conversion signal 295 are outputs from the state machine 240.

As such, the state machine 240 may be configured and/or configurable to reset the first and second pixels and/or to trigger the measurement circuitry to measure the charge stored in the second floating diffusion node.

It will be appreciated that, in other embodiments, the state machine 240 may alternatively or additionally be a circuit, combinatorial logic, sequential logic, a CPU, a programmable device, or the like.

Operation of the light sensor 200, in conjunction with the state machine 240 is now described with reference to FIGS. 2A, 2B and 3, wherein FIG. 3 is a timing diagram corresponding to operation of the light sensor 200 of FIG. 2A.

The first pixel 205 and the second pixel 255 are initially reset by asserting the transfer signal 225 and the reset signal 230 to couple the cathode of the first PPD 210 and the second PPD 260 to the second voltage reference 250. That is, the first PPD 210 and the second PPD 260, and their associated floating diffusion nodes, are reset to the second voltage reference 250.

Subsequently, both the transfer signal 225 and the reset signal 230 are negated to decouple the first PPD 210 and the second PPD 260, and their associated floating diffusion nodes, from the second voltage reference 250. The inputs to the comparator 285 are high impedance, and therefore the floating diffusion node, which is now effectively isolated, maintains a voltage at the second voltage reference 250.

The integration time commences, and first PPD 210 and the second PPD 260 start accumulating charge depending on an amount, e.g. an intensity of, incident light upon the first PPD 210 and the second PPD 260.

Initially, the cathodes of both the first PPD 210 and the second PPD 260 are at a voltage at the second voltage reference 250. As the light sensor 200 is exposed to light, electron-hole pairs are generated in each of the first PPD 210 and the second PPD 260.

Because the first PPD 210 is configured to be more sensitive to the incident light than the second PPD 260, electron-hole pairs are generated at a higher rate in the first PPD 210 than in the second PPD 260. Due to the electric field in each PPD 210, 260, the electron-hole pairs are separated, causing the voltage across each PPD 210, 260 to start to drop. The voltage across the first PPD 210 drops at a faster rate than the voltage across the second PPD 260.

Eventually, after an adequate exposure time, the voltage across the first PPD 210 drops to approximately zero volts, or even less. This may be indicative of PPD 210 reaching its FWC. At this stage, due to the drop in voltage between the gate and source of the first transfer transistor 215, the first transfer transistor 215 starts to conduct, e.g. leak current from drain to source. Due to the current leakage, the voltage on the drain of the first transfer transistor 215, e.g. the reset voltage maintained by the floating diffusion node, starts to drop substantially. As the drain of the first transfer transistor 215 is coupled to the first input to the comparator 280, the voltage at the first input to the comparator drops accordingly.

The drain of the second transfer transistor 265 is coupled to the second input to the comparator 280. Because the second PPD 260 is less sensitive to the incident light than the first PPD 210, the second PPD 260 has not, at this stage yet reached its FWC. Thus, the second input to the comparator 280 is maintained substantially at the reset voltage.

Thus, the output 235 of comparator 285 is configured to provide a trigger signal 310, effectively indicating that the first PPD 210 has reached its FWC. That is, the first pixel 205 is configured to operate as a FWC detector.

The second pixel 255 has, at the time of the trigger signal 310, not yet saturated at its FWC. Thus, the trigger signal 310 can be used as a trigger to measure the charge in the second pixel before the charge in the second pixel reaches its FWC.

In the example timing diagram of FIG. 3, it can be seen that, upon a FWC of the first PPD 210 being signalled by trigger signal 310, the following sequence of events takes place, under the control of the state machine 240.

The reset signal 230 is asserted, at a time denoted 315 in FIG. 3, to reset at least the first PPD 210, the second PPD 260 and the first and second floating diffusion nodes to the reset voltage, e.g. the second voltage reference 250.

Next, after a sufficient time for the second floating diffusion node associated with the second pixel 205 to reach the reset voltage, the integrating ADC 290 is triggered at a time denoted 320 in FIG. 3 by the start_conversion signal 295 to convert the reset voltage to a first digital value, e.g. a first count, denoted "adc_reset_value" in FIG. 3.

Next, at a time denoted 325 in FIG. 3, the reset signal 230 is negated to isolate the floating diffusion nodes from the reset voltage.

Next, at a time denoted 330 in FIG. 3, the transfer signal 225 is asserted to transfer the charge on the second PPD 260 to the second floating diffusion node.

Then, after a sufficient time for the second floating diffusion to charge, the integrating ADC 290 is triggered by a start_conversion signal 295, at a time denoted 335 in FIG. 3, to convert the floating diffusion node voltage to a second digital value, e.g. a second count, denoted "adc_value" in FIG. 3. Next, the state machine 240 is configured to subtract the second digital value from the first digital value to determine a third digital value, denoted "subtraction value" in FIG. 3, corresponding to light measured by the first pixel 205.

The state machine 240 is configured to accumulate such third digital values over a total exposure time (e.g. in response to a sum_up_digitally trigger signal to provide a digitally summed value which is equivalent to the previous value plus the subtraction value in FIG. 3). That is, the above process can be repeated each time the trigger signal 310 is asserted, i.e., each time the first PPD 210 reaches its FWC the second pixel 255 provides a measurement of the light incident upon the second pixel 255, and the state machine 240 is configured to accumulate such measurements over a total exposure time.

It will be appreciated that, in other embodiment, processing of digital values provided by the ADC, e.g. conversion results, may be conducted as part of a sequence as described, or may be conducted at a later time. For example, in one embodiment digital values provided by the ADC may be stored in a memory, and processed at a later time.

The measurement the light incident upon the second pixel 255 may be generally termed "reading" the second pixel 255, or performing a "readout", and such terms are used throughout the remainder of this description.

The provision of a trigger signal indicating the first charge reaching FWC of the first pixel 205 prevents the second pixel 255 from ever reaching its FWC. Furthermore, a total exposure time of the light sensor 200 is not limited to a time defined by the FWC of a pixel, as is the case in the prior art pixel 100 of FIG. 1. Instead, the light sensor 200 may be configured to repeatedly measure light using the second pixel 255, while using the first pixel 205 to ensure the second pixel 255 never reaches FWC, as described above. This ensures no light information is lost during an exposure time, by avoiding saturation of the second pixel 255. This also makes the light sensor 200 particularly suited to applications in which a long integration time is required. A maximum exposure time of the light sensor 200 is, in theory, only limited by the capabilities of the digital circuitry, e.g. a maximum value the state machine 240 is capable of accumulating.

Furthermore, the light sensor 200 only reads the second pixel 255, e.g. the light collector pixel 255, when FWC of the first pixel 205 is reached. As such, a rate, or frequency at which the light sensor 200 reads the second pixel 255 varies depending upon environmental factors, such as light conditions and temperature. For example, under high intensity light conditions, the light sensor 200 may read the second pixel 255 every 10 to 20 us. However, under low light conditions, the light sensor 200 may read the second pixel 255 in the region of once every millisecond. This may result in significant power savings, in particular in low light conditions.

The FWC of a photodiode has a linear dependence upon temperature and a logarithmic dependence upon light conditions. As such, accurate predictions of a FWC of a photodiode can be difficult. In prior art active pixels such as the 4T active pixel 100 of FIG. 1, it may be necessary to read the pixel 100 at a high rate in order to provide adequate margin to avoid saturation of the pixel 100, e.g. to avoid the pixel 100 reaching FWC. For example, cameras on smart phones may be configured to estimate exposure times for pictures in order to avoid saturation of pixels.

The light sensor 200 overcomes these shortcomings, because the light sensor 200 is configured to ensure that the second pixel 255 e.g. the light collector pixel 255, never reaches FWC, and thus estimation of an exposure time to avoid FWC with sufficient margin is no longer required.

Furthermore, the light sensor 200 is configured to use almost the entire available resolution of the integrating ADC 290, because rather than perform a readout in low light conditions at a fixed or predefined rate, readouts are instead only performed as necessary when the first pixel is at FWC, and the second pixel 255 is at a significant proportion of FWC, such as 90%, of FWC.

Also, a typical FWC of a PPD is very low, and normally in the range of 2000 to 20,000 electrons. PPDs, while highly sensitive, generally exhibit a very limited dynamic range due to the low FWC. The light sensor 200 overcomes this limitation because, as described above, the light measuring second pixel 255 is prevented from saturating. Thus, light sensor 200 has, effectively, no maximum resolution.

In an example embodiment, the state machine 240 may be configured to compensate for overhead time incurred during readout of the second pixel 255. That is, while the charge stored in the second pixel 255 is being measured using the integrating ADC 290, the second pixel 255 is not configured to operate as a photodiode for converting incident light into a voltage signal though a process of optical absorption. The state machine 240 may be configured to estimate light conditions during the overhead time. For example, the state machine 240 may be configured to extrapolate or interpolate between successive measurements of the charge stored in the second pixel 255 by making assumptions and/or predictions about changes in light conditions, e.g. predicting only limited changes in light conditions during a time required for readout of the pixel 205. For example, the state machine 240 may be configured to linearly interpolate, or perform second, third, or higher order interpolation between successive measurements of the charge stored in the second pixel 255 to compensate for overhead time.

In yet a further example embodiment, light sensor 200 may comprise two second pixels, i.e. a first light collector pixel and a second light collector pixel. The state machine 240 may be configured to compensate for overhead time incurred during readout by alternately using each of the first and second light collector pixels. That is, for example, the state machine 240 may be configured to compensate for overhead time incurred during readout by keeping the first light collector pixel in a reset state until a readout of the second light collector pixel is triggered. The triggering of the readout of the second light collector pixel will commence, e.g. immediately commence, exposure of the first light collector pixel. That is, the triggering of the readout of the second light collector pixel may cause the state machine to configure the first light collector pixel such that the photodiode of the first light collector pixel is electrically isolated from the voltage reference 250, thus configuring the first light collector pixel to commence accumulation of charge accordingly.

Similarly, the state machine 240 may be configured to compensate for overhead time incurred during readout by keeping the second light collector pixel in a reset state until a readout of the first light collector pixel is triggered. The triggering of the readout of the first light collector pixel will commence, e.g. immediately commence, exposure of the second light collector pixel. That is, the triggering of the readout of the first light collector pixel may cause the state machine to configure the second light collector pixel such that the photodiode of the second light collector pixel is electrically isolated from the voltage reference 250, thus configuring the second light collector pixel to commence accumulation of charge accordingly.

As such, the state machine 240 may be configured to use the first and second light collector pixels alternately, thus avoiding incurring any overhead associated with pixel readout time.

Although provision of an indication of a charge on the first pixel 205 reaching FWC is discussed, it will be appreciated that the light sensor 200 may be configured to indicate that other threshold capacities that are below FWC have been reached.

For example, the light sensor 200 may be configured to indicate a threshold capacity of 90%, 80%, 70% or even less of FWC.

Furthermore, in some embodiments, the state machine 240 may be configured to trigger a readout of the light collecting pixel, e.g. second pixel 255, at the end of the total exposure time, e.g. even if the first pixel 205 has not triggered a readout of the light collecting pixel. Beneficially, this may ensure all of the light collected by the light collecting pixel is accumulated by the state machine 240, and thus avoiding loss of light information during the exposure time.

In one embodiment, the first transfer transistor 215 may be configured to discharge the first floating diffusion node before FWC of the first pixel 205 is reached. In one embodiment this may be achieved by adjusting a voltage level at a gate of the first transfer transistor 215 to alter a voltage threshold at which the first transfer transistor 215 begins to discharge the first floating diffusion node. In other embodiments, the first transfer transistor 215 may be designed to discharge the first floating diffusion node at, or around, a desired voltage threshold.

Figure 4:
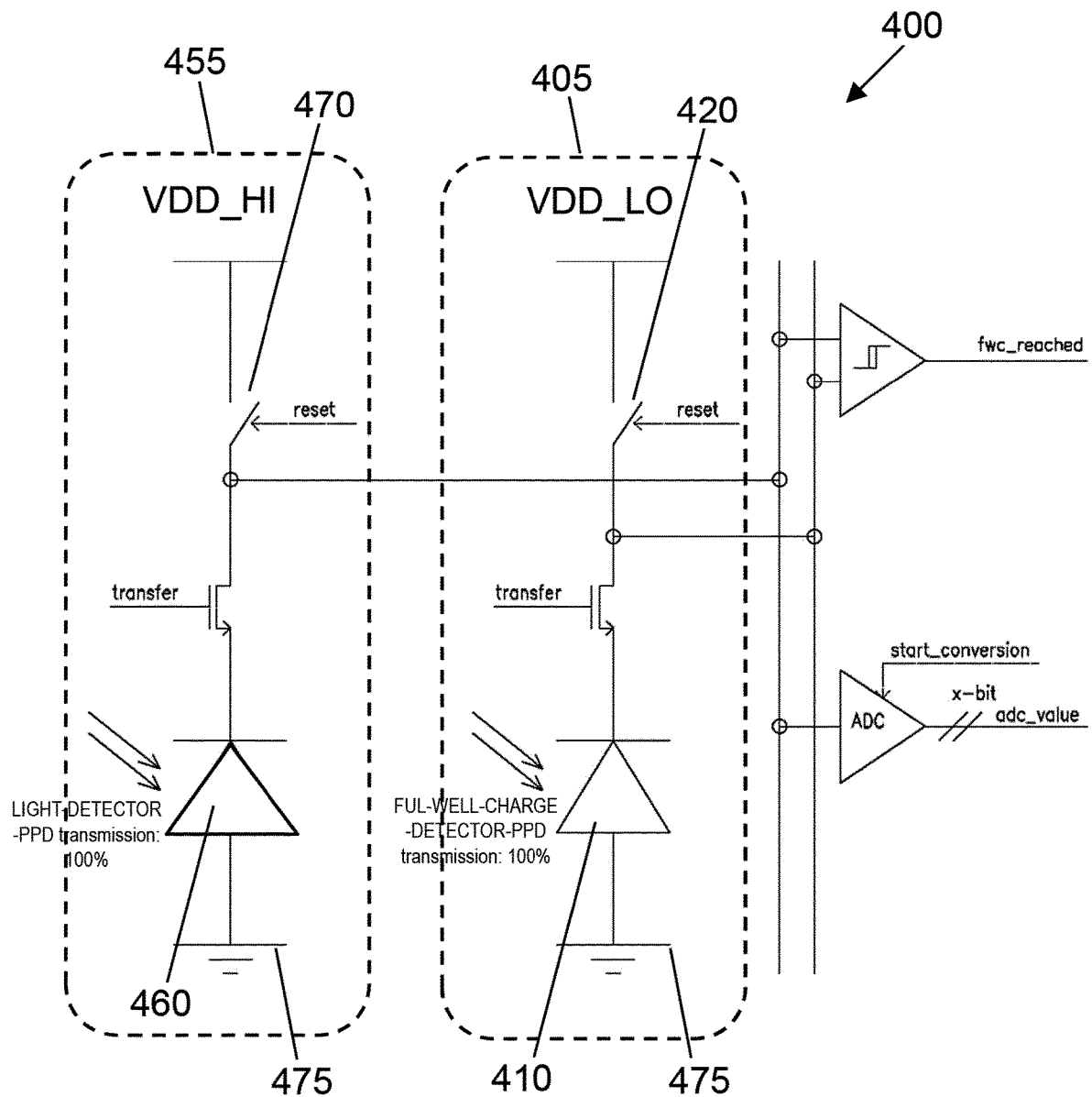
FIG. 4 a schematic diagram of a light sensor according to a further embodiment of the present disclosure.

FIG. 4 shows a schematic diagram of light sensor generally denoted 400 according to a further embodiment of the present disclosure. The circuit of the light sensor 400 is generally the same as that of the light sensor 200, and is therefore not described in detail. Salient differences between the light sensor 400 and the light sensor 200 are described below.

The light sensor 400 comprises a first pixel 405. The first pixel 405 is configured to operate as a FWC detector, as will be described below in more detail.

The first pixel 405 comprises a first PPD 410.

An anode of the first PPD 410 is coupled to a first voltage reference 475. In the example embodiment, the first voltage reference 475 is ground, e.g. 0V.

A cathode of the first PPD 410 is configurable to be coupled, via a first reset transistor 420, to a second voltage reference VDD_LO. The second voltage reference VDD_LO may be a power supply rail.

The light sensor 400 comprises a second pixel 455. The second pixel 455 is configured to operate as a light detector, as will be described below in more detail.

The second pixel 455 comprises a second PPD 460. An anode of the second PPD 410 is coupled to the first voltage reference 475.

A cathode of the second PPD 410 is configurable to be coupled, via a second reset transistor 470, to a third voltage reference VDD_HI. The third voltage reference VDD_HI may be a power supply rail.

The third voltage reference VDD_HI is at a higher voltage that the second voltage reference VDD_LO.

In contrast to the light sensors 200 of FIG. 2A, in the presently described embodiment both the first pixel 405 and the second pixel 455 are configured to be exposed to the same amount, e.g. intensity, of light, such as ambient light and/or light from a light source and/or light of a particular range of wavelengths that the first PPD 410 and second PPD 460 are sensitive to. That is, the first pixel 405 and the second pixel 455 are configured to have substantially the same sensitivity to the light.

Operation of the light sensor 400 is generally similar to that of light sensor 200. However, in contrast to light sensor 200 where both pixels are reset to a common voltage, in the embodiment of FIG. 4 the first pixel 405 is reset to VDD_LO, whereas the second pixel 455 is reset to VDD_HI.

As such, the first pixel 405 is configured to reach FWC before the second pixel 455. The comparator 485 is configured to provide a trigger signal, effectively indicating that the first PPD 410 has reached its FWC.

Because the first PPD 410 is reset to a lower voltage that the second PPD 460, the first PPD 410 will always reach FWC before the second PPD 460.

The comparator may, in some embodiments, be adapted or configured to accommodate the different reset voltages VDD_LO and VDD_HI. For example, in one embodiment a power supply to the comparator may be VDD_LO. In other embodiments, a voltage offset may be applied to one or both inputs to the comparator.

The embodiments described thus far comprise two pixels: a first pixel for FWC detection and a second pixel for light detection. It will be appreciated that in other embodiments, the light sensor may comprise more pixels. For example, the light sensor may comprise a plurality of second pixels. The light sensors may comprise an array of second pixels.

Figure 5:
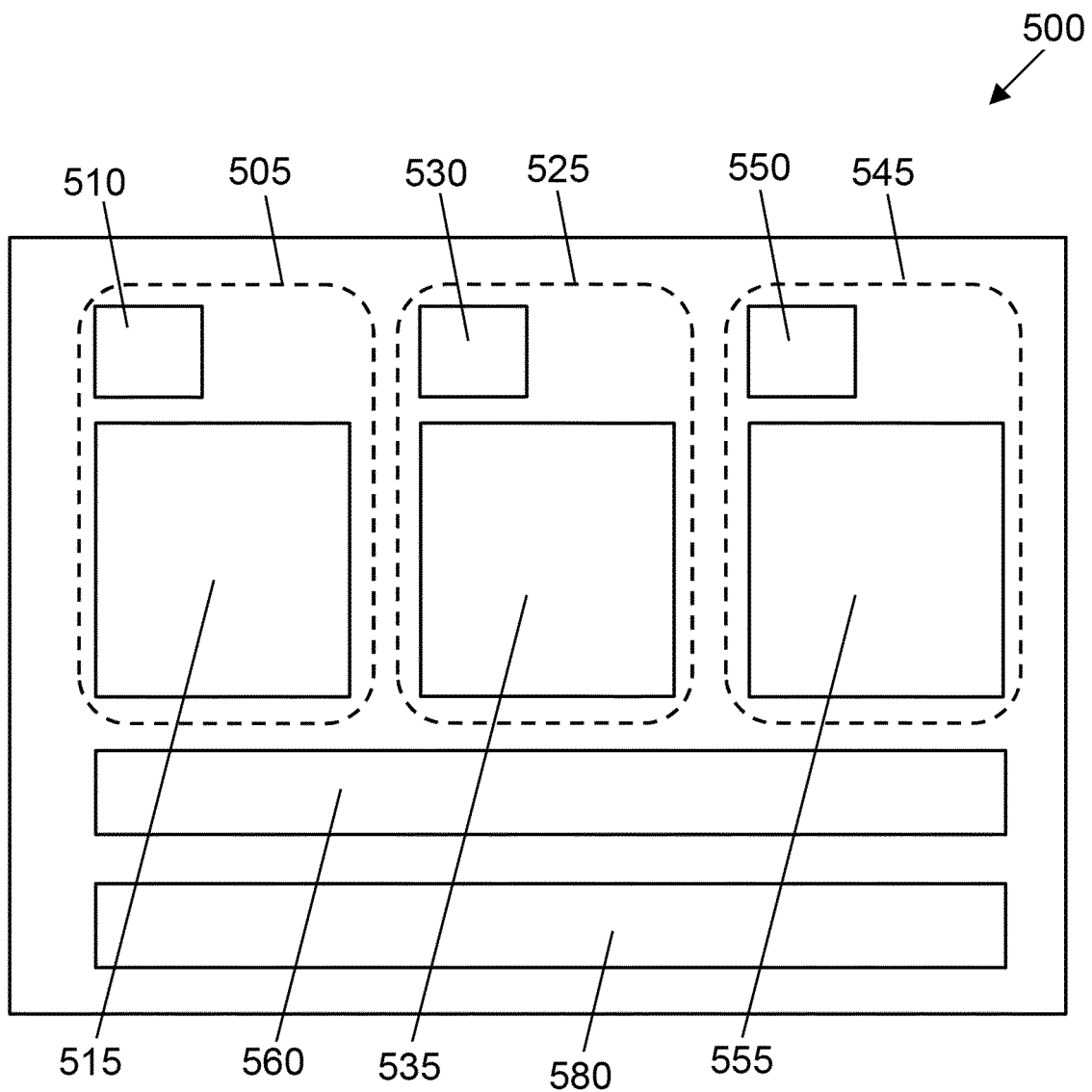
FIG. 5 an image sensor according to an embodiment of the present disclosure.

FIG. 5 depicts an example of an image sensor, generally denoted 500. The image sensor comprises a first light sensor 505. The first light sensor 505 may be similar to the light sensor 200 or 400 described above and comprises a first pixel 510 for FWC detection and a plurality of second pixels 515 for light detection. The first light sensor 505 is sensitive to light within a first range of wavelengths. In one embodiment the first range of wavelengths substantially corresponds to red light, e.g. a range centred around 564 to 580 nm. For example, a filter layer (not shown) may be applied to the first light sensor 505 to substantially restrict light incident upon the first light sensor 505 to the first range of wavelengths The image sensor comprises a second light sensor 525. The second light sensor 525 may be similar to the light sensor 200 or 400 described above and comprises a first pixel 530 for FWC detection and a plurality of second pixels 535 for light detection. The second light sensor 505 is sensitive to light within a second range of wavelengths. In one embodiment the second range of wavelengths substantially corresponds to green light, e.g. a range centred around 534 to 545 nm.

The image sensor comprises a third light sensor 545. The third light sensor 545 may be similar to the light sensor 200 or 400 described above and comprises a first pixel 550 for FWC detection and a plurality of second pixels 555 for light detection. The third light sensor 545 is sensitive to light within a third range of wavelengths. In one embodiment the third range of wavelengths substantially corresponds to blue light, e.g. a range centred around 420-440 nm.

As such, the image sensor 500 may be configured to operate as an RGB image sensor.

The image sensor also comprises logic and/or a state machine 560, CPU, or the like for controlling the first, second and third light sensors 505, 525, 545. It will be appreciated that, although a single state machine 560 is shown, in other embodiments each light sensor 505, 525, 545 may be associated with a dedicated state machine.

Similarly, other circuitry, such as measurement circuitry, may either be instantiated for each light sensor, or shared between a plurality of light sensors.

In example embodiments, the image sensor may also comprise a memory 580. The memory 580 may be for storing digital values provided by the measurement circuitry. The memory 580 may be for storing program code for execution by a CPU, e.g. for processing of image related data and/or for embodiments wherein the state machine 560 is, instead or additionally, a programmable CPU.

Figure 6:
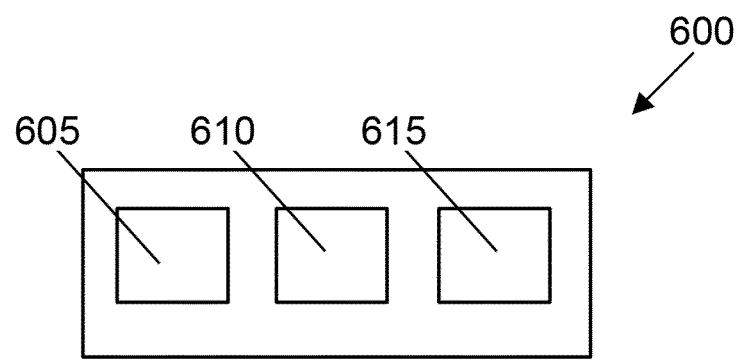
FIG. 6 an active pixel sensor according to an embodiment of the present disclosure.

FIG. 6 depicts an active pixel sensor, generally denoted 600, according to an embodiment of the present disclosure. In the example embodiment of FIG. 6, the active pixel sensor 600 is formed as a monolithic device. The active pixel sensor 600 comprises a plurality of light sensors 605, 610, 615, wherein each light sensor 605, 610, 615 corresponds to a light sensor 200 as shown in FIG. 2A. It will be appreciated that, although the active pixel sensor 600 of FIG. 6 comprises three light sensors 605, 610, 615, in other embodiments the active pixel sensor 600 may comprise fewer than or more than three light sensors.

In yet further embodiments, a first light sensor 605 of the plurality of light sensors is sensitive to light within a first range of wavelengths, and another light sensor 610, 615 of the plurality of light sensors is sensitive to light within a second range of wavelengths different to the first range of wavelengths.

Figure 7:
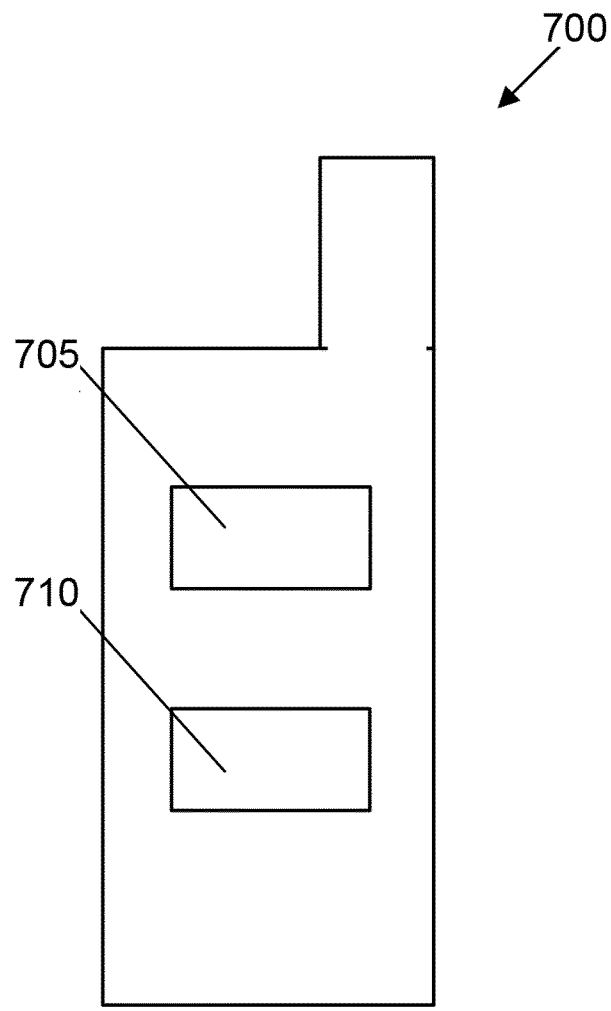
FIG. 7 and a device according to an embodiment of the present disclosure.

FIG. 7 depicts a device, generally denoted 700, according to an embodiment of the present disclosure. The device comprises a processor 705 and an image sensor 710. The image sensor may be, for example, an image sensor as shown in FIG. 5. In other embodiments, the device may additionally, or alternatively, comprise at least one active pixel sensor, such as that described in relation to FIG. 6, and/or at least one light sensor such as that described in relation to FIG. 2A.

The device 700 is, for purposes of example only, a cellular phone. It will be appreciated that, in other examples, the device may be a digital camera, a security camera, a laptop or tablet device, an image recording device, or the like.

The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the disclosure.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS active pixel 100
photodiode 105
reset transistor 110
transfer transistor 115
floating diffusion node 120
source follower transistor 125
row select transistor 130.
P+ implant 150
voltage reference 160
light sensor 200
first pixel 205
first PPD 210
first transfer transistor 215
first reset transistor 220
transfer signal 225
reset signal 230
output 235
state machine 240
adc_value 245
second voltage reference 250
second pixel 255
second PPD 260
second transfer transistor 265
second reset transistor 270
first voltage reference 275
comparator 280
measurement circuitry 285.
ADC 290
start_conversion signal 295
trigger signal 310
denoted time 315
denoted time 320
denoted time 325

LIST OF REFERENCE NUMERALS -continued denoted time 330
denoted time 335
denoted time 315
light sensor 400
first pixel 405
first PPD 410
first reset transistor 420
second pixel 455
second PPD 460
second reset transistor 470
first voltage reference 475
comparator 485
image sensor 500
first light sensor 505
first pixel 510
second pixels 515
second light sensor 525
first pixel 530
second pixels 535
third light sensor 545
first pixel 550
second pixels 555
state machine 560
memory 580
active pixel sensor 600
light sensor 605
light sensor 610
light sensor
device 700
processor 705
image sensor 710

The invention claimed is:

1. A light sensor comprising:
a first pixel;
a second pixel; and measurement circuitry;
wherein the first pixel is configured to accumulate a first charge and the second pixel is configured to accumulate a second charge when the light sensor is exposed to light;
wherein the first pixel is configured to trigger the measurement circuitry to measure the second charge when the first charge reaches a threshold capacity of the first pixel; and
wherein the second pixel is configured to be less sensitive to and/or less exposed to a range of wavelengths of light than the first pixel.

2. The light sensor of claim 1 wherein the first and second pixels each comprise a pinned photodiode.

3. The light sensor of claim 1 wherein the threshold capacity corresponds to a full-well capacity of the first pixel, or to a proportion of the full-well capacity of the first pixel.

4. The light sensor of claim 3 wherein the first and second pixels are configured such that, when the light sensor is exposed to light, the first charge reaches the threshold capacity of the first pixel before the second charge reaches a full-well capacity of the second pixel.

5. The light sensor of claim 1 wherein the second pixel comprises a layer configured to restrict incidence of a range of wavelengths of light upon at least a portion of a light-sensitive section of the second pixel.

6. The light sensor of claim 5, wherein the layer comprises a material that is substantially opaque or translucent to a range of wavelengths of light that the light-sensitive section of the second pixel is sensitive to.

7. The light sensor of claim 1, wherein a reset voltage of the first pixel is different to a reset voltage of the second pixel.

8. The light sensor of claim 1, wherein the first pixel and the second pixel are fabricated to exhibit substantially the same electrical characteristics and/or comprise substantially the same full-well capacity.

9. The light sensor of claim 1, wherein the measurement circuitry comprises an analogue to digital converter (ADC), wherein the ADC is configured to convert a voltage corresponding to the second charge into a digital signal.

10. The light sensor of claim 1, comprising a state machine and/or a circuit configured to repeat the following steps for a predefined exposure time:
reset the first and second pixels; and
trigger the measurement circuitry to measure the second charge when the first charge reaches the threshold capacity.

11. The light sensor of claim 10, wherein the state machine and/or the circuit is configured to do at least one of:
determine a total charge over the predefined exposure time by accumulating successive measurements of the second charge; and/or
compensate for an overhead time incurred during measurement of the second charge.

12. The light sensor of claim 1, wherein the first pixel and/or the second pixel comprises a 4T active pixel.

13. The light sensor of claim 1, comprising a plurality of second pixels.

14. The light sensor of claim 13, wherein each second pixel is configured to accumulate an associated charge when the light sensor is exposed to light; and wherein the first pixel is configured to trigger the measurement circuitry to measure the associated charges when the first charge reaches the threshold capacity.

15. An active pixel sensor comprising a plurality of light sensors according to claim 1.

16. The active pixel sensor of claim 15, wherein:
a first light sensor of the plurality of light sensors is sensitive to light within a first range of wavelengths; and
a second light sensor of the plurality of light sensors is sensitive to light within a second range of wavelengths different to the first range of wavelengths.

17. The active pixel sensor of claim 15, configured to operate as an RGB and/or wideband and/or flicker image sensor.

18. A image sensor comprising:
an array of pixels; and
at least one light sensor according to claim 1.

19. A device comprising:
a processor; and at least one of:
at least one image sensor including an array of pixels;
at least one active pixel sensor further comprising a plurality of light sensors; and/or
at least one light sensor according to claim 1.

20. The light sensor of claim 1 wherein the first pixel is configured to trigger the measurement circuitry to measure the second charge when the first charge reaches the threshold capacity of the first pixel and the second charge reaches a significant proportion of the threshold capacity,
wherein the threshold capacity corresponds to a full-well capacity of the first pixel, and the significant proportion of the threshold capacity is 70%-90% of the full-well capacity of the first pixel.

* * * * *